United States Patent [19]

Bathgate

[11] 4,369,126

[45] Jan. 18, 1983

[54] CHEMICAL BLOWING AGENT

[75] Inventor: Raymond J. Bathgate, Royston, England

[73] Assignee: FBC Limted, Hauxton, England

[21] Appl. No.: 246,044

[22] Filed: Mar. 20, 1981

[30] Foreign Application Priority Data

Mar. 21, 1980 [GB] United Kingdom ............... 80/09658

[51] Int. Cl.$^3$ .............................................. C06D 5/06
[52] U.S. Cl. ...................................... 252/350; 264/54; 264/55; 264/DIG. 5; 521/73; 521/89; 521/92; 521/93; 521/94; 521/95; 521/909; 521/910
[58] Field of Search .................. 521/909, 910, 95, 89, 521/92, 93, 94, 73; 252/350; 264/DIG. 5

[56] References Cited

U.S. PATENT DOCUMENTS

| | | | |
|---|---|---|---|
| 3,340,209 | 9/1967 | Riley, Jr. et al. | 521/909 |
| 3,502,754 | 3/1970 | Felur | 521/910 |
| 3,511,787 | 5/1970 | Bertorelli et al. | 521/73 |
| 3,658,730 | 4/1972 | Takohoshi et al. | 521/92 |
| 4,183,822 | 1/1980 | Collington et al. | 252/350 |
| 4,263,165 | 4/1981 | Roos et al. | 521/92 |

*Primary Examiner*—Morton Foelak
*Attorney, Agent, or Firm*—Morgan, Finnegan, Pine, Foley & Lee

[57] ABSTRACT

The present invention relates to a composition comprising a blowing agent and an activator characterised in that the blowing agent and activator have been micronised together rather than separately as hitherto; to methods for making the composition and to the use of the compositions in expanding polymers.

14 Claims, No Drawings

CHEMICAL BLOWING AGENT

The present invention relates to a blowing agent composition, methods for making it and expandable compositions containing it.

Blowing agents which decompose upon heating to give off a gas have been used for many years in the expansion of thermoplastic polymers. However, the decomposition temperature may be too high for a given polymer and/or the gas may be evolved over a comparatively wide temperature range. Therefore, an activator for the blowing agent is often mixed with the blowing agent; see for example U.S. Pat. Nos. 3,305,496 and 3,511,787 and Spanish Pat. No. 444996 which describe the use of heavy metal, alkali-metal or alkaline-earth-metal salts or a special form of reactive silica as activators in azodicarbonamide blowing agents. Whilst the activators and blowing agents used may have had particle sizes less than 50 micrometers and may have been mixed together to form a powder additive, there has been no suggestion that the activator and blowing agent should be micronised together. Furthermore, whilst the presence of an activator may reduce the actual temperature at which decomposition begins, it will not usually affect the temperature spread over which the majority of the gas is evolved.

Surprisingly, we have now found that if the blowing agent is mixed with the activator and the mixture itself is then micronised, enhanced results can be obtained from the mixture. This is most unexpected since mixing of separately micronised blowing agent and activator does not produce the same result.

Accordingly, the present invention provides a method for making a blowing agent composition which comprises comminuting a mixture of the blowing agent and an activator for the blowing agent until the mean particle size of the mixture is less than 5 micrometers.

The invention also provides a blowing agent composition comprising a mixture of a blowing agent and an activator for the blowing agent characterized in that the mixture has been comminuted to a mean particle size of less than 5 micrometers.

The invention further provides an expandable polymer composition comprising a thermoplastic polymer and a blowing agent composition of the invention.

The present invention can be applied to a wide range of thermally decomposable blowing agents and activators. Thus, suitable blowing agents for present use include nitrogen evolving blowing agents; notably azo compounds, (e.g. azodicarbonamide) and sulphonhydrazides [e.g. benzene sulphonhydrazide and oxy-bis(-benzenesulphonhydrazide)]. A particularly preferred blowing agent is azodicarbonamide. Suitable activators for present use include amines and amides, e.g. containing from 1 to 10 carbon atoms; urea; sulphonhydrazides (which may also act as secondary blowing agents); metal salts, oxides or soaps, e.g. oxides, mineral acid salts (e.g. the phosphates, sulphates or carbonates) and fatty acid (e.g. $C_8$ to $C_{20}$ aliphatic acid) soaps or complexes of zinc, cadmium, lead or tin.

The activator and blowing agent are present in any suitable amount, typically in weight ratios of 1:20 to 1:1. If desired, other ingredients may be present in the mixture before or after micronisation. Suitable other ingredients include secondary blowing agents which may be provided by the use of excess of certain of the activators, e.g. zinc carbonate or a sulphonhydrazide; plasticisers; oils; pigments; lubricants and fillers.

The composition of the invention is made by comminuting the ingredients together as opposed to separately as hitherto. The term comminution is used herein to denote the reducing in size of individual particles of a material and does not include only the mere breaking up of aggregations of smaller particles. Comminution can be carried out by any suitable method. Preferably the mixture is micronised, notably in a fluid energy mill, preferably an air powered mill. Comminution is carried out until the mean particle size is less than 5 micrometers, e.g. 2 to 4.5 micrometers. The particle sizes quoted herein are those determined by carrying out a particle size analysis of the material using a Coulter Counter model TA and the mean particle size is that corresponding to a 50% retention in the particle size analysis. In an air powered microniser this is achieved by suitable selection of the air pressure and the feed rate of material to the mill.

The blowing agent, activator and other ingredients may be premixed before comminution or can be fed separately, e.g. by screw feeds, to the comminutor.

The blowing agent composition according to the invention may be used for expanding a wide range of thermoplastic polymers, or polymers which are thermoplastic at the outset of the expansion process but which are cross linked, vulcanised or otherwise rendered thermoset during or after the expansion process, for example natural and synthetic rubbers. Suitable polymers include polyolefins (such as polyethylene, polypropylene and polybutylene), olefin copolymers (such as copolymers of ethylene/propylene and ethylene/vinyl acetate), polystyrene, styrene copolymers (such as acrylonitrile/butadiene/styrene copolymers), polyvinyl chloride, and vinyl chloride copolymers. Preferably the polymer is polyvinyl chloride.

The blowing agent composition is suitably present in the polymer as 0.01 to 30, preferably 1 to 5, parts by weight of the active blowing agent ingredient per hundred parts by weight of polymer.

Because of its good dispersibility, the blowing agent composition of the invention can be incorporated directly into the thermoplastic polymer during the compounding, tumbling or mixing operation using any suitable techniques. However, if desired, the blowing agent composition can be first compounded into a pre-mix containing a relatively high proportion of the active blowing agent ingredient, for example 15 to 30 parts by weight per hundred parts by weight of polymer or as much as 70 parts per 30 parts of plasticizer when preparing a pre-mix for use with polyvinyl chloride. This pre-mix can then be incorporated into the bulk of the polymer in any of the conventional ways.

The expandable composition can also contain any of the usual additives; for example stabilisers, lubricants, plasticisers, fillers, dyes, pigments and secondary blowing agents.

The blowing agent composition of the invention offers the advantages over the analogous conventionally blended compositions of a lower decomposition temperature, a narrower decomposition temperature range and an increase in the rate of evolution of gas from the composition.

The following Examples are given to illustrate the invention, all parts and percentages are by weight.

EXAMPLE 1

200 Parts azodicarbonamide (available under the trade mark GENITRON AC2) were mixed with 60 parts of zinc oxide in a low speed, low shear screw-mixer.

The above AC/ZnO composition was then micronised in a 12 inch microniser at an air pressure of 85 p.s.i. to give a product with a mean particle size of 4.5 micrometers. This product is referred to as the AC/ZnO comicronised composition.

Azodicarbonamide and zinc oxide were micronised separately using the same technique and the products were then mixed in a high speed mixer to give a blend containing the same proportions as the AC/ZnO comicronised composition. The blended product is referred to as the AC blend below.

The AC/ZnO composition and the AC blend were then heated to cause decomposition of the azodicarbonamide and the amount of gas evolved was measured. The results were as follows:

|  |  | Decomposition temperature | Total gas evolved cc/g |
|---|---|---|---|
| AC/ZnO | Comicronised Composition | 135° C. | 160 |
| AC Blend |  | 170° C. | 160 |

EXAMPLE 2

The process of Example 1 was repeated using 70 parts of AC and 30 parts of zinc carbonate. In this case the comicronised composition decomposed at 136°–147° C. and the blended composition decomposed at 143° to 164° C.

EXAMPLE 3

The following polymer composition was prepared from the AC/ZnO comicronised composition and AC blend prepared as in Example 1:

| Polyvinyl chloride | 100 parts |
|---|---|
| Dioctyl phthalate | 57.5 parts |
| Calcium carbonate | 15 parts |
| Blowing agent mixture | 2.5 parts |

The mixture was then coated on to a backing sheet at a rate of 350 g/m² and pre-gelled at 125° C. A transparent non-expanding plastisol layer was coated onto the expandable layer at a rate of 200 g/m². The product was heated to 200° C. for 106 seconds to decompose the blowing agent. The results are set out below in arbitrary units of thickness.

|  | AC/ZnO Comicronised Composition | AC Blend |
|---|---|---|
| Total expanded thickness | 79 | 67 |
| Foam layer thickness | 39 | 27 |

EXAMPLE 4

The following polymer compositions were prepared from the AC/ZnCO₃ comicronised composition and AC blend prepared as in Example 2:

| Polyvinyl chloride | 100 parts |
|---|---|
| Dioctyl phthalate | 80 parts |
| Calcium carbonate | 5 parts |
| Blowing agent mixture | 3.5 parts |

The mixture was then coated on to a release paper at a rate of 350 g/m² and pre-gelled at 125° C. The product was heated to 200° C. for times varying from 30 to 120 seconds to decompose the blowing agent and produce a foam. At various time intervals the foam thicknesses were measured and the expansion factors calculated. The expansion factor is the thickness of the foam divided by the original unexpanded thickness. The expansion factors were plotted against time and the times taken to achieve given factor values established. The results were as follows:

| Expansion Factor | Oven Dwell Time | | % reduction in dwell time using comicronised composition |
|---|---|---|---|
| | Comicronised | Blend | |
| 2.0 | 35 | 50 | 30 |
| 2.5 | 39 | 60 | 35 |
| 2.8 | 45 | 70 | 35 |

| Example No | Expansion Factor | Blowing Agent Composition | Oven Dwell Time | | Oven Temperature °C. | % Reduction in dwell time |
|---|---|---|---|---|---|---|
| | | | Comicronised | Blend | | |
| 5 | 2.0 | 70 parts AC | 42.5 | 51 | 200 | 16 |
| | 2.5 | 30 parts ZnO | 46 | 57.5 | 200 | 20 |
| | 2.8 | | 49 | 62.5 | 200 | 21 |
| 6 | 2.0 | 70 parts AC | 45 | 52.5 | 200 | 14 |
| | 2.5 | 30 Zn stearate | 50 | 72.5 | 200 | 31 |
| | 2.8 | | 56 | 86 | 200 | 35 |
| 7 | 2.0 | 60 parts AC | 63 | 97 | 170 | 35 |
| | 2.5 | 25 parts ZnO | 79 | 131 | 170 | 40 |
| | 2.8 | 15 parts urea | 89 | 152 | 170 | 41 |
| 8 | 2.0 | 95 parts AC | 100 | 135 | 190 | 26 |
| | 2.5 | 15 parts benzene sulphonhydrazide | 135 | 200 | 190 | 32 |
| | | 0.1 parts of ZnO per 100 parts of resin were incorporated into the polymer | | | | |

I claim:

1. A method for making a blowing agent composition which comprises a solid, thermally decomposable blowing agent and a solid activator for the blowing agent characterised in that a mixture of the blowing agent and the activator is comminuted until the mean particle size of the mixture is less than 5 micrometers.

2. A blowing agent composition comprising a mixture of a solid, thermally decomposable blowing agent and a solid activator for the blowing agent characterised in that the mixture has been comminuted to a mean particle size of less than 5 micrometers.

3. A method as claimed in claim 1 wherein the blowing agent is selected from an azo compound or a sulphonhydrazide.

4. A method as claimed in claim 1 wherein the activator for the blowing agent is selected from amines and amides, urea; sulphonhydrazides; metal salts, oxides or soaps.

5. A method as claimed in claim 1 wherein the activator is used in weight ratios of 1:20 to 1:1 based on the weight of the blowing agent.

6. A method as claimed in claim 3 wherein said azo compound is azodicarbonamide.

7. A method as claimed in claim 4 wherein said amines and amides have alkyl groups containing from 1 to 10 carbon atoms.

8. A method as claimed in claim 4 wherein said metal salts and oxides are oxides or salts of zinc, cadmium, lead or tin.

9. A composition as claimed in claim 2 wherein the blowing agent is selected from an azo compound or a sulphonhydrazide.

10. A composition as claimed in claim 9 wherein said azo compound is azodicarbonamide.

11. A composition as claimed in claim 2 wherein the activator for the blowing agent is selected from amines and amides, urea, sulphonhydrazides, metal salts, oxides or soaps.

12. A composition as claimed in claim 2 wherein the activator is used in weight ratios of 1:20 to 1:1 based on the weight of the blowing agent.

13. A composition as claimed in claim 11 wherein said amines and amides have alkyl groups containing from 1 to 10 carbon atoms.

14. A composition as claimed in claim 11 wherein said metal salts and oxides are oxides or salts of zinc, cadmium, lead or tin.

* * * * *